United States Patent [19]

Yoshimura et al.

[11] Patent Number: 4,938,723

[45] Date of Patent: Jul. 3, 1990

[54] FABRICATED ELASTIC COUPLING FOR USE IN INBOARD/OUTBOARD ENGINE

[75] Inventors: Tsuyoshi Yoshimura; Shiegeki Shiozawa, both of Hamamatsu, Japan

[73] Assignee: Sanshin Kogyo Kabushiki Kaisha, Hamamatsu, Japan

[21] Appl. No.: 277,145

[22] Filed: Nov. 29, 1988

[30] Foreign Application Priority Data

Nov. 30, 1987 [JP] Japan ................................ 62-299851

[51] Int. Cl.$^{5}$ ........................ B63H 23/00; F16D 3/78; F16D 3/76

[52] U.S. Cl. .......................................... 440/52; 440/83; 464/89; 464/98

[58] Field of Search ....................... 440/52, 83; 464/87, 464/89, 90, 91, 98, 99, 147, 100, 101, 162, 177

[56] References Cited

U.S. PATENT DOCUMENTS 1,941,061 12/1933 Thiry .................................... 464/89
2,142,784 1/1939 Guy ........................................ 464/89
3,136,281 6/1964 Kiekhaefer et al. .................. 440/52
3,354,670 11/1967 Fawick ............................. 464/89 X
4,634,391 1/1987 Entringer et al. ................ 440/52 X

FOREIGN PATENT DOCUMENTS 3343857 6/1985 Fed. Rep. of Germany ........ 464/89

*Primary Examiner*—Daniel P. Stodola
*Attorney, Agent, or Firm*—Ernest A. Beutler

[57] ABSTRACT

A coupling for a marine outboard drive for coupling the engine output shaft to the input shaft of the outboard drive. The coupling is formed of a composite member having a molded hub portion that defines a curved recess and a sheet metal member that is affixed to the hub member and which is adapted to be affixed to the engine output shaft. An elastomeric member is received in the recess of the hub member and supports an internally splined member that has a splined connection to the input shaft of the outboard drive.

8 Claims, 3 Drawing Sheets

151 160 152 154 156 157 153 161 155 164 163 159 158 167 162 165 166 168

174
178
177
172
169
185

154
169
171
172
184
7
186
174
173
177
183
85
178
175
176

FABRICATED ELASTIC COUPLING FOR USE IN INBOARD/OUTBOARD ENGINE

BACKGROUND OF THE INVENTION

This invention relates to a coupling for use in an inboard/outboard engine and more particularly to an improved coupling arrangement suitable for use in a marine outboard drive.

A very popular type of propulsion device used in watercraft is the so-called inboard/outboard drive in which an inboard mounted engine drives an outboard mounted propulsion unit which is steerable and tiltable like an outboard motor. These types of drives have a number of advantages but do present certain design problems. Specifically, it is the normal practice to couple the output shaft of the engine through its flywheel to an input shaft of the outboard drive which extends through the hull and transom of the watercraft into the outboard drive unit. Because of the mounting arrangement and problems attendant therewith, it is desirable if this coupling will accommodate misalignment between the engine shaft and the input shaft. A wide variety of couplings have been proposed for this purpose, however, they all have some disadvantages, as will now be described.

FIG. 1 shows one conventional type of coupling, indicated generally by the reference numeral 11, that serves the purpose of coupling an engine output shaft 12 to the input shaft 13 of the outboard drive unit. The engine output shaft 12 has a flange portion 14 to which a flywheel 15 is affixed in a known manner, as by means of bolts 16.

The coupling 11 is comprised of a generally barrel shaped section 17 that has a correspondingly shaped recess 18 and a flange portion 19 that is affixed to the flywheel 13 and engine output shaft 12 by the bolts 16. An elastomeric sleeve 21 is received within the recess 18 and supports an internally splined member 22. The internally splined member 22 receives a splined end 23 of the input shaft 13.

The disadvantage with this type of construction is first that the bolting arrangement for securing the coupling 11 to the flywheel 19 requires a spacing 1 between the barrel shaped portion 17 and the flange 19 so as to access the bolts 16. As a result, the device tends to be quite long and also requires somewhat intricate assembly because of the difficulty in accessing the bolt 16.

Another form of prior art coupling is shown in FIG. 2 and incorporates a coupling 51 for coupling an engine driven flywheel 52 to the outboard drive input shaft 53. The coupling 51 includes a torsional vibration damper 54 for absorbing torsional vibrations but has substantially no construction that will accommodate angular or axial misalignments between the engine output shaft and the outboard drive input shaft 53.

FIG. 3 shows yet another prior art type of coupling arrangement wherein a coupling 101 is provided for connection to a flywheel 102 which is, in turn, affixed to the engine output shaft 103. The coupling 101 couples the input shaft 104 of the outboard drive unit to the engine shaft 103.

In accordance with this type of coupling, the coupling is formed from a sheet metal member 105 that has a generally barrel shaped configuration and defines a recess 106 in which an elastic sleeve 107 is formed. The sleeve 107 supports an internally splined member 108 that is coupled to splines 109 of the outboard drive input shaft 104. The member 105 also has a flange 111 that is affixed, as by bolts 112 to the flywheel so as to complete the coupling.

The disadvantage with this type of construction is that it is rather expensive to manufacture. That is, the member 105 must be formed by means of an internal die so as to form the barrel shaped recess 106 and, accordingly, the device is relatively expensive, particularly where small scale production is necessary that does not justify the high tooling costs.

It is, therefore, a principal object of this invention to provide an improved, compact and low cost coupling for an inboard/outboard drive.

It is a further object of this invention to provide a low cost, easily fabricated and yet highly versatile coupling for an inboard/outboard drive that will accommodate large variations in angular position between the coupled shafts.

SUMMARY OF THE INVENTION

This invention is adapted to be embodied in a coupling for connecting a driving shaft to a driven shaft and for permitting misalignment between the shafts. The coupling comprises a hub member formed as an integral piece with a recess formed at one end thereof. The recess is curved in cross sections taken through its axis of rotation. A sheet member is rigidly affixed to the hub member and is adapted to be connected to one of the shafts. An internally splined member adapted to have a splined connection with the other of the shafts is joined to the hub member by an elastic member that is interposed between the hub member and the internally splined member.

BRIEF DESCRIPTION OF THE DRAWINGS

FIG. 8 is an enlarged cross-sectional view, in part similar to FIG. 5, showing a still further embodiment of the invention.

DETAILED DESCRIPTION OF THE PREFERRED EMBODIMENT OF THE INVENTION

Figure 4:
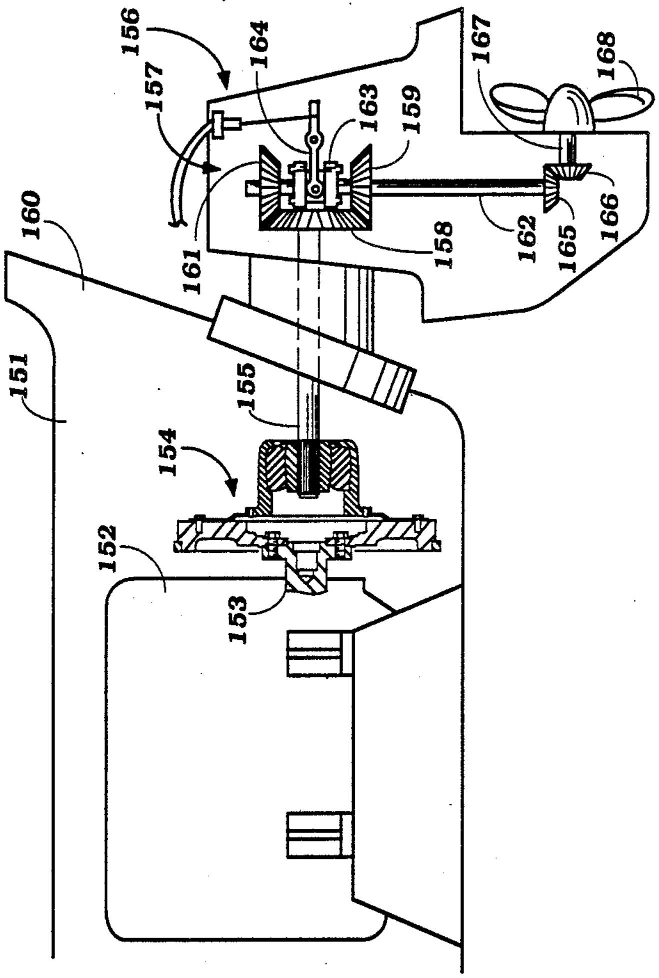
FIG. 4 is an enlarged side elevational view of a watercraft and marine outboard drive embodying a coupling constructed in accordance with an embodiment of the invention with portions broken away and other portions shown in section.

Referring first to FIG. 4, a watercraft, indicated generally at 151 is provided with a marine inboard/outboard drive incorporating a coupling constructed in accordance with an embodiment of the invention. The outboard drive includes an internal combustion engine 152 that is supported within the hull of the watercraft and which has an output shaft 153 that rotates about an axis that extends generally longitudinally of the watercraft 151. A coupling member constructed in accordance with an embodiment of the invention 154 couples the engine output shaft 153 to an input shaft 155 of an outboard drive unit, indicated generally by the reference numeral 156. Although the outboard drive unit 156 may be of any known type, it is supported on a transom 160 of the hull for steering movement about a generally vertically extending axis and for tilt and trim movement about a generally horizontally extending axis. This supporting arrangement may be of any known type and since this forms no part of the invention, it will not be described further, nor is it illustrated.

The outboard drive 156 includes a forward, neutral, reverse transmission 157 of a generally known type that includes an input driving bevel gear 158 that is affixed to the end of the input shaft 155 spaced from the coupling 154. The driving bevel gear 158 drives a pair of counterrotating forward and reverse bevel gears 159 and 161 that are disposed on opposite diametrical sides of the driving bevel gear 158. The gears 159 and 161 are journaled on a drive shaft 162 and a dog clutching sleeve 163 has a splined connection to the drive shaft 162 and is disposed between the bevel gears 159 and 161. The dog clutching sleeve 163 has oppositely facing dog clutching teeth that are designed to cooperate with corresponding dog clutching teeth on the gears 159 or 161 for selectively coupling either of these gears to the drive shaft 162 for driving it in forward or reverse directions of rotation. A shift lever 164 which is connected to a remotely positioned operator (not shown) completes the transmission 157.

A bevel gear 165 is affixed to the lower end of the drive shaft 162 and meshes with a bevel gear 166 that is affixed to a propeller shaft 167. A propeller 168 is affixed to the exposed end of the propeller shaft 167 for powering the watercraft 151 in a known manner.

Figure 1:
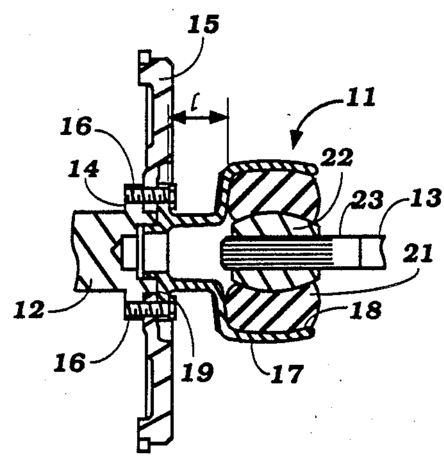
FIG. 1 is a cross-sectional view taken through one form of prior art coupling employed in marine inboard/outboard drives.
Figure 2:
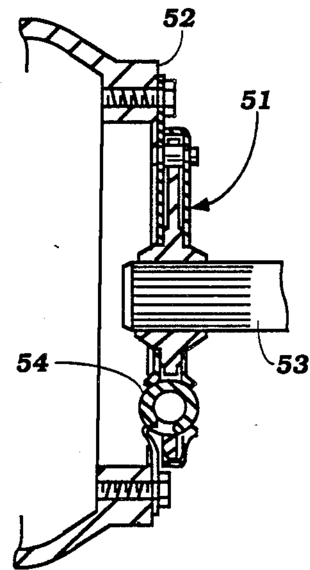
FIG. 2 is a cross-sectional view taken through another type of coupling used in marine outboard drives.
Figure 3:
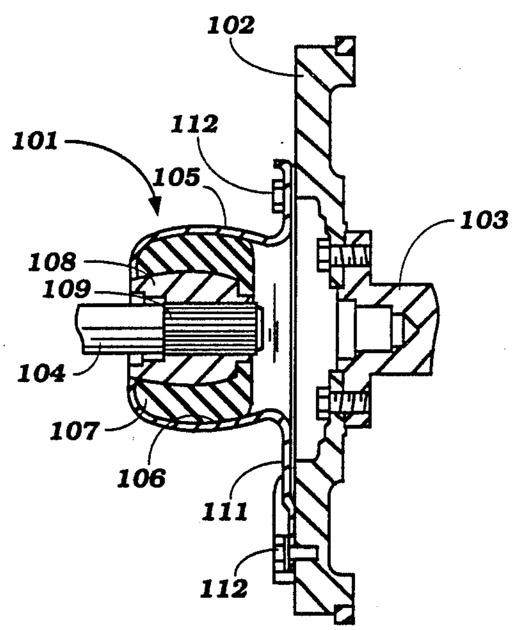
FIG. 3 is a cross-sectional view taken through a still third type of coupling used in marine outboard drives.
Figure 5:
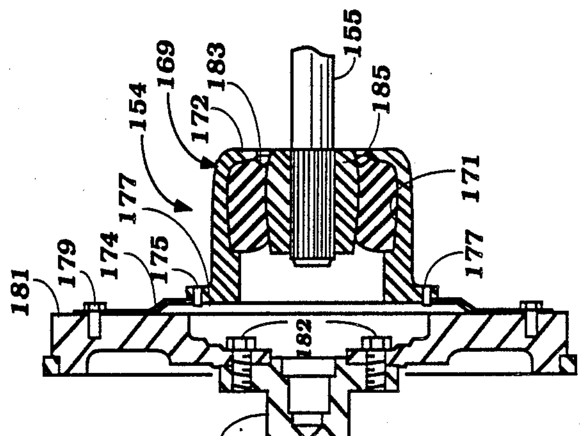
FIG. 5 is an enlarged cross-sectional view showing the coupling connection between the engine output shaft and the outboard drive input shaft.
Figure 7:
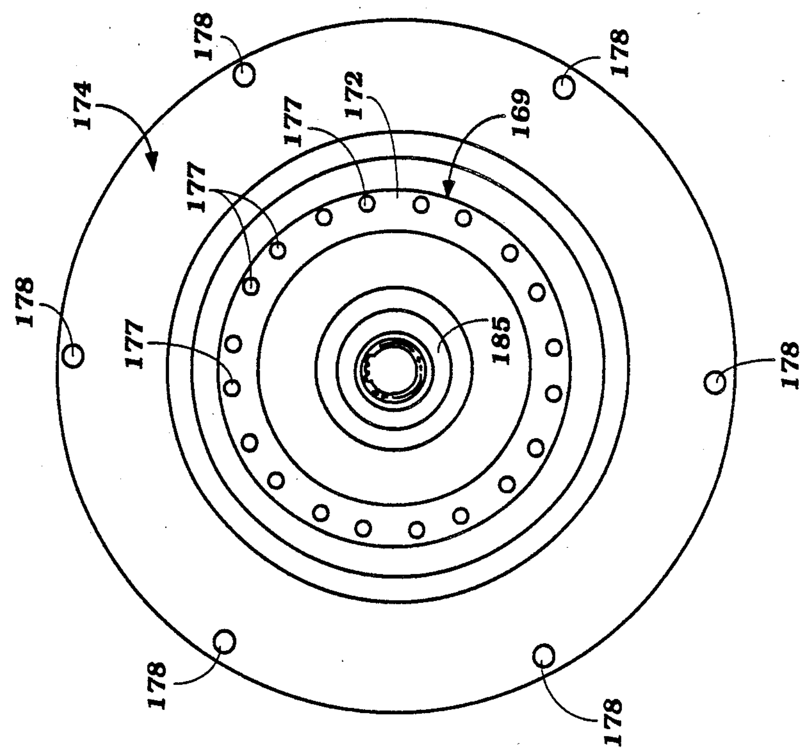
FIG. 7 is an end elevational view of the coupling looking in the direction of the arrow 7 in FIG. 6.
Figure 6:
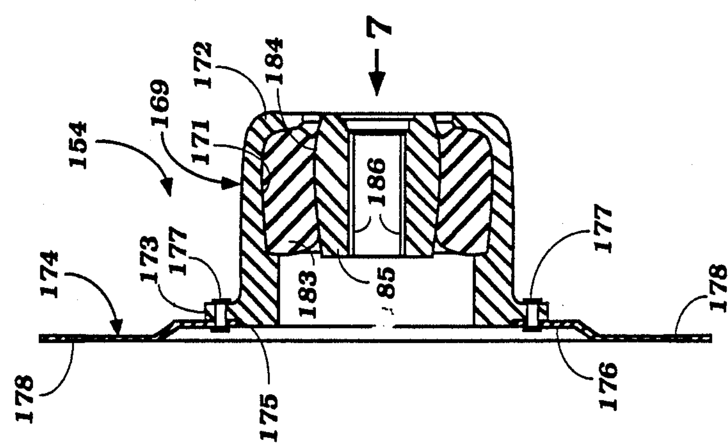
FIG. 6 is a still further enlarged cross-sectional view of the coupling.

Referring now primarily to FIGS. 5 through 7, the construction of the coupling 154 will be described. The coupling 154 is comprised of a first hub member, indicated generally at 169, which is formed from a casting such as cast iron or the like so as to facilitate a low cost. The hub member 169 is formed with a generally barrel shaped recess 171, which can be conveniently formed by the casting process and which is generally closed at its rear end by an integral wall 172 with a flange 173 being formed at the forward end. Other metals may be used for the cast hub 169 or, alternatively, the hub 169 may be molded from a suitable high strength plastic material (FIG. 8). Because of the cast or molded operation in forming the hub 169, the recess 171 may be conveniently formed and low production volumes and low costs are possible.

An annular plate member 174, which may be formed as a sheet metal stamping, defines a central opening 175 that has a flange portion 176 that is affixed to the hub flange portion 173 by means of rivets 177 or the like. The periphery of the sheet metal member 174 is formed with openings 178 that pass threaded fasteners such as bolts 179 for affixing the coupling 154 to a flywheel 181 that is affixed by bolts 182 to the engine output shaft 153.

An elastomeric sleeve 183 is affixed within the recess 171, as by bonding, and is also bonded or adhesively secured to a cylindrical outer surface 184 of an internally splined member 185. The splined member 185 has internal splines 186 so as to couple it to the input shaft 155.

As a result of the aforedescribed construction, the coupling member 154 may be formed from a very low cost and lot offers a compact construction and yet will accommodate substantial misalignments between the engine output shaft 153 and the outboard drive input shaft 155.

The foregoing description is that of a preferred embodiment of the invention and various changes and modifications may be made without departing from the spirit and scope of the invention, as defined by the appended claims.

We claim:

1. A coupling for connecting a driving shaft to a driven shaft and for permitting misalignment between said shafts comprising a relatively thick molded hub member with a recess formed at one end, said recess being curved in cross sections taken through the axis of rotation therein, a separate attachment member formed from a thin walled sheet material and having greater flexibility than said hub member adapted to be connected to one of said shafts, fastening means rigidly affixing said attachment member to said hub member, an internally splined member adapted to have a splined connection to the other of said shafts, and an elastic member received with said hub member recess and resiliently connecting said internally splined member to said hub member.

2. A coupling as set forth in claim 1 wherein the hub member is a cast metal.

3. A coupling as set forth in claim 1 wherein the hub member is a molded plastic.

4. A coupling as set forth in claim 1 wherein the elastic member is bonded to the hub member and the internally splined member.

5. A marine outboard drive adapted to be affixed to the rear of a transom of a watercraft hull, an engine output shaft driven by an internal combustion engine mounted within the hull, said outboard drive having an input shaft extending through the transom of the watercraft and into the hull, and a coupling for connecting said engine output shaft to said outboard drive input shaft and for permitting misalignment between said shafts comprising a relatively thick molded hub member with a recess formed at one end thereof, said recess being curved in cross sections taken through the axis of rotation therein, a separate attachment member formed from a thin walled sheet material and having greater flexibility than said hub member, and adapted to be connected to one of said shafts, fastening means rigidly affixing said attachment member to said hub member, an internally splined member adapted to have a splined connection to the other of said shafts, and an elastic member received within said hub member recess and resiliently connecting said internally splined member to said hub member.

6. A marine outboard drive as set forth in claim 5 wherein the hub member is a cast metal.

7. A marine outboard drive as set forth in claim 5 wherein the hub member is a molded plastic.

8. A marine outboard drive as set forth in claim 5 wherein the elastic member is bonded to the hub member and the internally splined member.

* * * * *